United States Patent
Meshchaninov et al.

(10) Patent No.: US 12,083,566 B2
(45) Date of Patent: Sep. 10, 2024

(54) METHOD OF DESTRUCTION OF ORGANIC WASTE WITH LOW CONTENT OF WATER

(71) Applicants: Mikhail Aleksandrovich Meshchaninov, Zhukovskiy (RU); Dmitrii Yanovich Agasarov, Krasnodar (RU); Anton Viktorovich Sergeev, Krasnodar (RU)

(72) Inventors: Mikhail Aleksandrovich Meshchaninov, Zhukovskiy (RU); Dmitrii Yanovich Agasarov, Krasnodar (RU)

(73) Assignees: Mikhail Aleksandrovich Meshchaninov, Zhukovskiy (RU); Dmitrii Yanovich Agasarov, Krasnodar (RU); Anton Viktorovich Sergeev, Krasnodar (RU)

( * ) Notice: Subject to any disclaimer, the term of this patent is extended or adjusted under 35 U.S.C. 154(b) by 132 days.

(21) Appl. No.: 18/221,098

(22) Filed: Jul. 12, 2023

(65) Prior Publication Data

US 2023/0347395 A1    Nov. 2, 2023

Related U.S. Application Data

(63) Continuation of application No. PCT/IB2022/060909, filed on Nov. 14, 2022.

(30) Foreign Application Priority Data

Dec. 30, 2021    (RU) ................. 2021140063

(51) Int. Cl.
  *B09B 3/50* (2022.01)
  *F23G 5/08* (2006.01)
  *H02N 1/04* (2006.01)

(52) U.S. Cl.
  CPC .............. *B09B 3/50* (2022.01); *F23G 5/085* (2013.01); *H02N 1/04* (2013.01)

(58) Field of Classification Search
  CPC .................. B09B 3/50; F23G 5/085
  USPC ........................................ 588/311
  See application file for complete search history.

(56) References Cited

U.S. PATENT DOCUMENTS

| | | |
|---|---|---|
| 2005/0021102 A1 | 1/2005 | Ignagni et al. |
| 2008/0208280 A1 | 8/2008 | Lindenthaler et al. |
| 2013/0318947 A1 | 12/2013 | Malik et al. |
| 2014/0142652 A1 | 5/2014 | Francois et al. |
| 2016/0067485 A1 | 3/2016 | Lindenthaler et al. |
| 2020/0164207 A1 | 5/2020 | Meyyappan et al. |
| 2021/0104906 A1 | 4/2021 | Wang et al. |

FOREIGN PATENT DOCUMENTS

| | | |
|---|---|---|
| CN | 1316615 A | 10/2001 |
| CN | 103204467 A | 7/2013 |
| CN | 103368447 A | 10/2013 |
| CN | 205288095 U | 6/2016 |
| CN | 110995050 A | 4/2020 |
| EA | 012275 B1 | 8/2009 |
| ES | 2909949 A1 | 5/2022 |
| FR | 1237539 A | 7/1960 |
| GB | 516158 A | 12/1939 |
| JP | H08299747 A | 11/1996 |
| KR | 20080050318 A | 6/2022 |
| KZ | 24850 A4 | 11/2011 |
| RU | 2116244 C1 | 7/1998 |
| RU | 2122519 C1 | 11/1998 |
| RU | 12220 U1 | 12/1999 |
| RU | 61705 U1 | 3/2007 |
| RU | 2326487 C2 | 6/2008 |
| RU | 2410835 C1 | 1/2011 |
| RU | 122466 U1 | 11/2012 |
| RU | 2592085 C1 | 7/2016 |
| RU | 2741004 C1 | 1/2021 |
| RU | 2753275 C1 | 8/2021 |
| UZ | 5108 B | 4/2002 |
| UZ | 4426 C | 10/2011 |
| WO | 2012/044875 A1 | 5/2012 |

OTHER PUBLICATIONS

Search report in PCT/IB2022/060911, dated Feb. 28, 2023.
Ecotechnics, Equipment for cleaning processes for industrial gases and liquids: A study guide / D.E. Smirnov ( et al.); gen. ed. by L.V. Chekalov, A.V. Sugak.—Yaroslavl: YaGTU publ., 2013.—180 pages. ISBN 978-5-9914-0351-1.
Aristova N.A., Piskarev I.M., Ivanovskiy A.V., Selemir V.D., Spirov G.M., Shlepkin S.I., Initiation of chemical reactions by electrical discharge in dielectric-gas-liquid configuration // Physical Chemistry Journal, 2004, vol. 78, #7, pp. 1326-1331.
Piskarev I.M., Oxidation-reduction processes in water initiated by electrical discharge above water surface // General Chemistry Journal, 2001, vol. 71, Issue 10, p. 1622.
Search report in PCT/IB2022/058934, dated Dec. 15, 2022.
Search report in PCT/IB2022/058935, dated Dec. 22, 2022.
Search report in PCT/IB2022/058937, dated Dec. 15, 2022.

(Continued)

*Primary Examiner* — Edward M Johnson
(74) *Attorney, Agent, or Firm* — Bardmesser Law Group

(57) ABSTRACT

The invention relates to methods of disposing household waste, in particular, to methods of disposing waste with low content of water by plasma-chemical destruction. The invention is directed to attaining a technical effect of broadening range of technical solutions by providing a method of destruction of organic waste with low content of water. The technical effect is attained by a destruction method, where organic waste with low content of water is loaded into a reactor via an input opening, and waste of biological origin is loaded additionally. The reactor is provided in form of a closed cavity, which inner surface is made conductive entirely or partially and grounded. An electrode protrudes into the reactor, which is isolated from the grounded surface. High-voltage pulses are supplied to the electrode. The pulses cause formation of corona discharge streamers in a gap between the electrode and the conductive surface of the reactor.

9 Claims, 1 Drawing Sheet

(56) References Cited

OTHER PUBLICATIONS

Search report in PCT/IB2022/060872, dated Mar. 2, 2023.
Search report in PCT/IB2022/060909, dated Mar. 2, 2023.
Rybka D. V. et al., Koronnyi razryad v vozdukhe atmosfernogo davleniya pri modul'nnom impul'se napryazheniya dlitel'nosti 10 ms (Coronal discharge in air of atmospheric pressure with modular voltage impulse of duration 10 ms), Optika atmosfery i okeana (Optics of atmosphere and ocean), 26, No. 1, 2013.

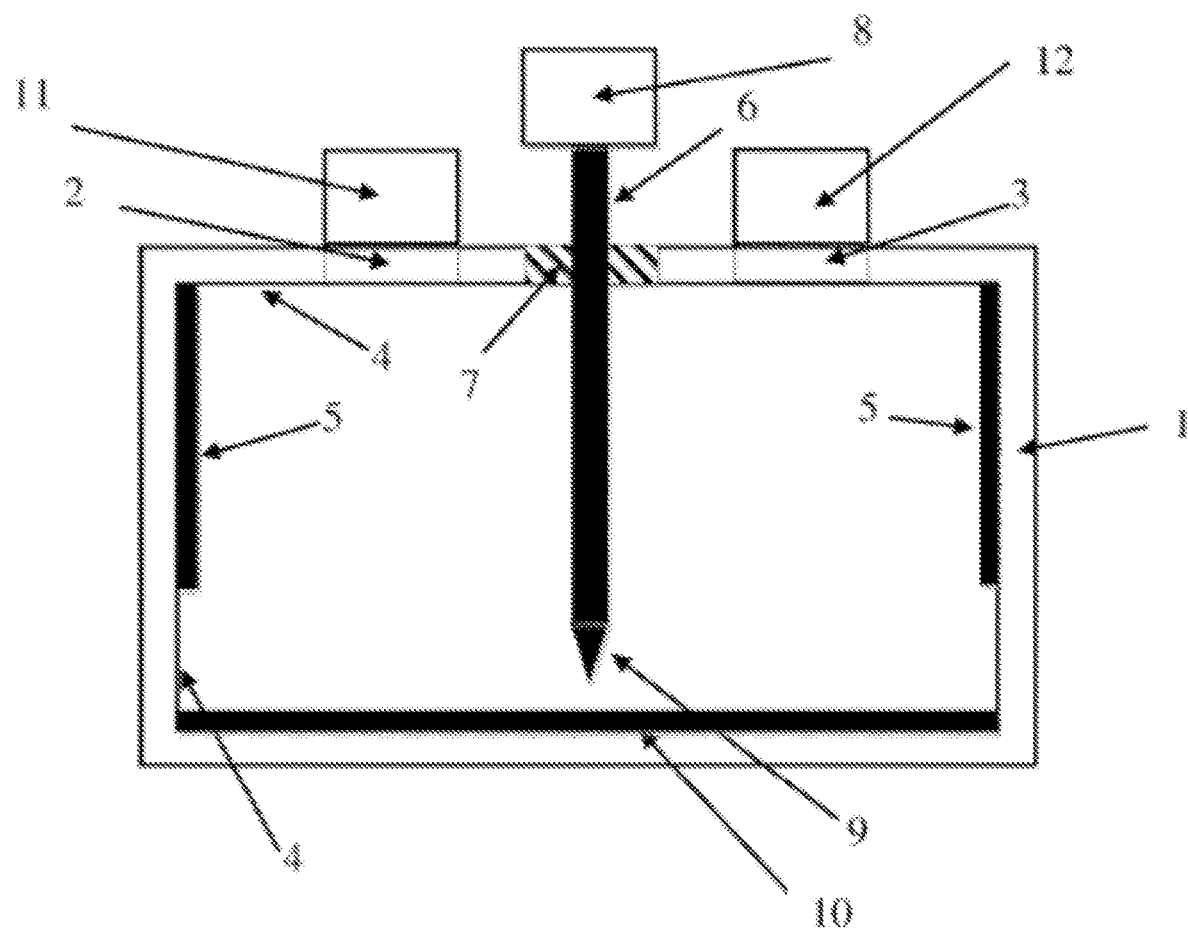

METHOD OF DESTRUCTION OF ORGANIC WASTE WITH LOW CONTENT OF WATER

FIELD OF INVENTION

The invention relates to methods of disposing household waste, in particular, to methods of disposing waste with low content of water by plasma-chemical destruction.

PRIOR ART

There is a known method of solid organic waste treatment implemented in a device of patent RU2741004 (published on Jan. 22, 2021), where solid organic waste is treated by way of vapor plasma gasification conversion with generation of syngas. The treatment is performed by a high-temperature plasma reactor, where water vapor is used as a plasma-supporting gas and temperature of reaction area is about 1600 to 2000° C.

Disadvantages of this method are requirement of substantial heating for its carrying out and incomplete treatment of solid organic household waste, since the treatment results in syngas that also needs to be disposed.

According to document [1], plasma of discharges under atmospheric pressure exerts an effect on water and causes formation of free radicals upon destruction of water molecules: $H_2O \rightarrow OH \cdot + H \cdot$. According to document [2], a chain reaction of organic substances oxidation process in presence of water may be initiated by atmospheric oxygen and ozone, but with a low rate. High-rate chain reaction is initiated by OH radicals. With insufficient amount of water, concentration of free radicals is insignificant, which does not allow initiating chain reaction of oxidation of organic substances in water.

SUMMARY OF INVENTION

The invention is directed to attaining a technical effect of broadening range of technical solutions by providing a method of destruction of organic waste with low content of water.

This technical effect is attained by a destruction method, where organic waste with low content of water is loaded into a reactor via an input opening, and waste of biological origin is additionally loaded. The reactor is provided in form of a closed cavity, whose inner surface is made conductive entirely or partially and grounded. An electrode protrudes into the reactor, and this electrode is isolated from the grounded surface. High-voltage pulses are supplied to the electrode. The pulses cause formation of corona discharge streamers in a gap between the electrode and the conductive surface of the reactor.

It is known that waste of biological origin contains up to 98% of water ("Algae" in Table 2 of article "Water" in The Great Soviet Encyclopedia). Plasma of streamers of corona discharge initiated in the reactor exerts an effect on water contained in the waste of biological origin, thus causing formation of free radicals due to disintegration of water molecules $H_2O \rightarrow OH \cdot + H \cdot$ contained therein. In addition, other active substances are formed in the reactor due to corona discharge streamers: $O_3$, $O_2(a^1\Delta)$, $H_2O_2$, OH, $O(^3P)$, NO, $HNO_2$ and $HNO_3$. Corona discharge also causes ultraviolet (UV) radiation. The above-mentioned active substances and UV radiation exert destructive action on any organic and inorganic substances contained in the household waste, including organic waste with a low content of water, thus providing complete destruction thereof and formation of harmless gaseous reaction products, namely, water and carbon dioxide. Non-organic contents of the waste are destroyed by acids.

In other words, this method provides plasma-chemical destruction of both organic and inorganic substances contained in the waste, including the organic waste with low content of water.

Preferably, size of the gap between the electrode and at least one of conductive portions of the cavity inner surface is in a range of 5 to 50 millimeters.

Preferably, entry of atmospheric air into the reactor is restricted, when implementing the method. Preferably, the waste is loaded into the reactor in dosed amounts. Preferably, the waste doses are loaded into the reactor in compressed form, while ingress of atmospheric air into the reactor is restricted.

Preferably, the household waste with low content of water and the waste of biological origin are loaded into the reactor simultaneously or consequently, when implementing the method. Preferably, pressure inside the reactor is decreased by 0.1 to 1.0 Pa compared to atmospheric pressure. In one embodiment of the method, depression is provided at the reactor output to decrease pressure inside the reactor.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the invention.

In the drawings:

The FIGURE shows a vertical cross-section of the reactor for implementation of the claimed method.

DETAILED DESCRIPTION OF EMBODIMENTS OF THE INVENTION

Reference will now be made in detail to the preferred embodiments of the present invention, examples of which are illustrated in the accompanying drawings.

The FIGURE shows a vertical cross-section of the reactor for implementation of the claimed method, where the following designators are used:

1—reactor body with inner cavity;
2—input opening;
3—output opening;
4—inner surface of reactor cavity;
5—conductive portions of inner surface of reactor cavity;
6—tipped electrode;
7—isolating members;
8—source of high-voltage pulses;
9—electrode tip;
10—conductive bottom of reactor;
11—device for dosed loading waste to be treated;
12—electrostatic filter with extraction air fan providing depression at reactor output.

The method is implemented by use of the reactor provided in form of the closed body (1) with a bottom (10) that is made conductive and grounded. The electrode (6) having the tip (9) protrudes into the body (1). The tip (9) is isolated from the conductive bottom (10) of the body (1) and directed towards it. A portion of compressed organic waste with low content of water is loaded from the device (11) for dosed loading of waste to be treated via the input opening (2) of the body (1), after that a portion of compressed waste of biological origin is loaded, while entry of atmospheric air into the body (1) is restricted. High-voltage pulses are supplied to the electrode (6) from the source (8). As it is known from document [1], large number of streamers occur near the tip (9) of the electrode (6) with each pulse. The streamers start multiplying and spreading towards the conductive bottom (10) of the body (1), gradually populating the inter-electrode gap and forming streamer corona discharge. Plasma of the corona discharge exerts an effect on water contained in the waste of biological origin that is loaded into the reactor and causes formation of free radicals upon destruction of water molecules: $H_2O \rightarrow OH\cdot + H\cdot$, which after their formation, exert influence on the organic waste with low content of water either. In addition, other active substances are formed in the reactor due to corona discharge: $O_3$, $O_2(a^1\Delta)$, $H_2O_2$, $OH$, $O(^3P)$, $NO$, $HNO_2$ and $HNO_3$. Corona discharge also causes ultraviolet (UV) radiation. The above-mentioned active substances and UV radiation exert destruction action on any organic and inorganic substances contained in the waste to be treated, thus providing complete destruction thereof and formation of harmless gaseous reaction products, namely, water and carbon dioxide. Non-organic contents of the waste are destroyed by acids. Process of oxidation of organic substances in water is a chain reaction [2]. Low-rate chain reaction may be initiated by atmospheric oxygen and ozone. However, high-rate chain reaction is initiated by $OH\cdot$ radicals only, whose formation in the reactor is caused by effect of corona discharge plasma on water that is contained in the waste of biological origin. In other words, the device provides plasma-chemical destruction of both organic and inorganic substances contained in the waste, including the organic waste with low content of water. Gaseous products of destruction enter the output opening (3) of the reactor.

Thus, the specified technical effect is attained in form of providing the method of plasma-chemical destruction of both organic and non-organic substances contained in waste, including organic waste with low content of water.

Having thus described a preferred embodiment, it should be apparent to those skilled in the art that certain advantages of the described method and apparatus have been achieved.

It should also be appreciated that various modifications, adaptations, and alternative embodiments thereof may be made within the scope and spirit of the present invention. The invention is further defined by the following claims.

Non-Patent Documents

[1] Aristova N. A., Piskarev I. M., Ivanovskiy A. V., Selemir V. D., Spirov G. M., Shlepkin S. I., Initiation of chemical reactions by electrical discharge in dielectric-gas-liquid configuration/Physical Chemistry Journal, 2004, Vol. 78, #7, pages 1326-1331.

[2] Piskarev I. M., Oxidation-reduction processes in water initiated by electrical discharge above water surface/General Chemistry Journal, 2001, Vol. 71, Issue 10, page 1622.

What is claimed is:

1. A method of destruction of organic waste with low content of water, comprising:
   loading organic waste with low content of water into a reactor via an input opening;
   loading waste of biological origin into the reactor,
   wherein the reactor has (i) a closed cavity, whose inner surface is made conductive entirely or partially and grounded, and (ii) an electrode that is isolated from the grounded surface and protrudes into the reactor; and
   supplying high-voltage pulses to the electrode, thereby causing formation of corona discharge streamers in a gap between the electrode and the inner surface of the reactor.

2. The method of claim 1, wherein the gap between the electrode and at least one of conductive portions of the cavity inner surface is in a range of 5 to 50 millimeters.

3. The method of claim 1, wherein entry of atmospheric air into the reactor is restricted during loading the waste.

4. The method of claim 1, wherein the waste is loaded into the reactor in dosed amounts.

5. The method of claim 4, wherein the dosed amounts are loaded into the reactor in compressed form.

6. The method of claim 1, wherein the organic waste with low content of water and the waste of biological origin are loaded into the reactor simultaneously.

7. The method of claim 1, wherein the organic waste with low content of water and the waste of biological origin are loaded into the reactor sequentially.

8. The method of claim 1, wherein pressure inside the reactor is 0.1 to 1.0 Pa less than atmospheric pressure.

9. The method of claim 8, wherein an exhaust pump at a reactor output provides the pressure inside the reactor that is 0.1 to 1.0 Pa less than the atmospheric pressure.

\* \* \* \* \*